United States Patent [19]

Weiss

[11] 4,307,287
[45] Dec. 22, 1981

[54] ELECTRIC COOKING APPLIANCE

[75] Inventor: Roger Weiss, Crecy-la-Chapelle, France

[73] Assignee: Moulinex, Bagnolet, France

[21] Appl. No.: 206,465

[22] Filed: Nov. 13, 1980

[30] Foreign Application Priority Data

Nov. 28, 1979 [FR] France ............................ 79 29252

[51] Int. Cl.³ .......................................... F27D 11/02
[52] U.S. Cl. ..................................... 219/442; 99/333; 219/432; 219/433; 219/438; 219/435; 219/441
[58] Field of Search ............... 219/385, 386, 429, 430, 219/432, 433, 435, 438, 439, 441, 442, 521; 99/285, 331, 332, 333, 335

[56] References Cited

U.S. PATENT DOCUMENTS

| | | | |
|---|---|---|---|
| 2,785,277 | 3/1957 | Jepson | 219/442 |
| 3,010,006 | 11/1961 | Schwaneke | 219/442 |
| 3,384,195 | 5/1968 | Jepson et al. | 219/442 |
| 3,508,485 | 4/1970 | Munsey | 99/331 |
| 3,908,111 | 9/1975 | DuBois et al. | 219/442 |
| 4,234,783 | 11/1980 | Aoshima | 219/441 |
| 4,241,288 | 12/1980 | Aoshima et al. | 219/441 |

Primary Examiner—Volodymyr Y. Mayewsky
Attorney, Agent, or Firm—Young & Thompson

[57] ABSTRACT

The electric cooking appliance has a casing for receiving a removable vessel in which food to be cooked is placed. An electrical heating element is provided in the casing for heating the vessel. The supply of electrical power to the heating element is controlled by a control device including a supply switch and a manually settable control circuit arranged during the normal cooking phase to intermittently place the supply switch in its conducting state so that power is supplied to the heating element intermittently. Prior to the normal cooking phase, the control circuit maintains the supply switch continuously in its conducting state for an initial period of time which is independent of the manual setting of the control circuit.

11 Claims, 7 Drawing Figures

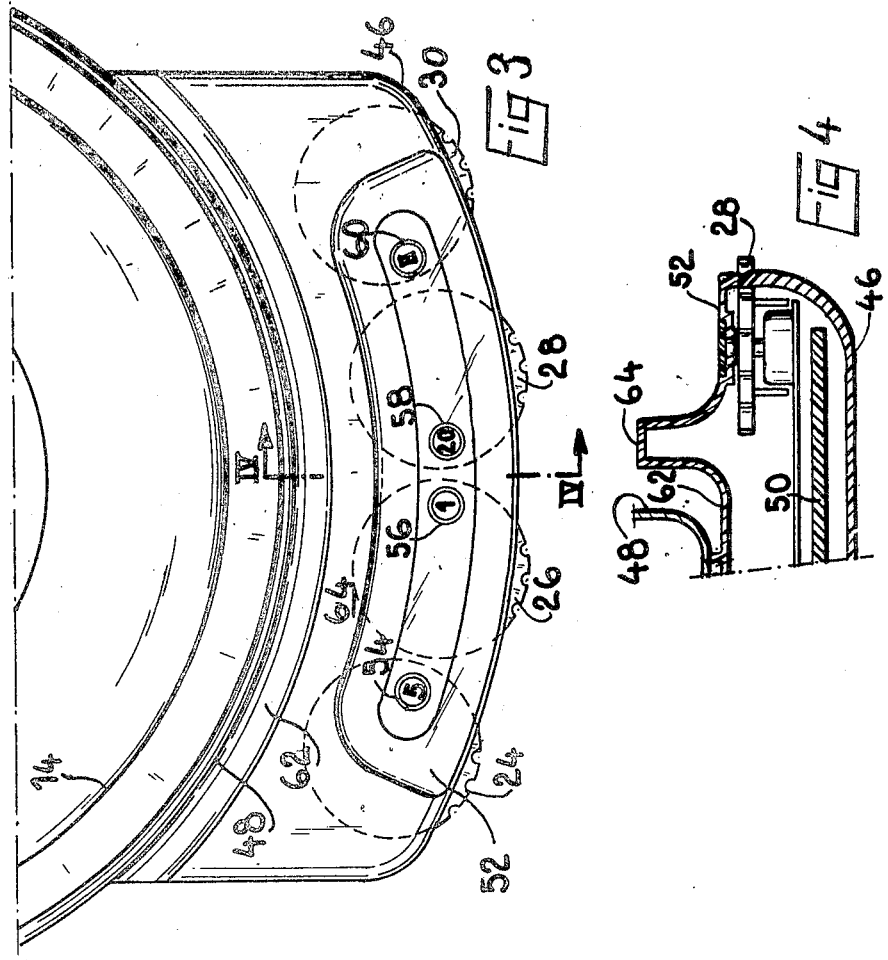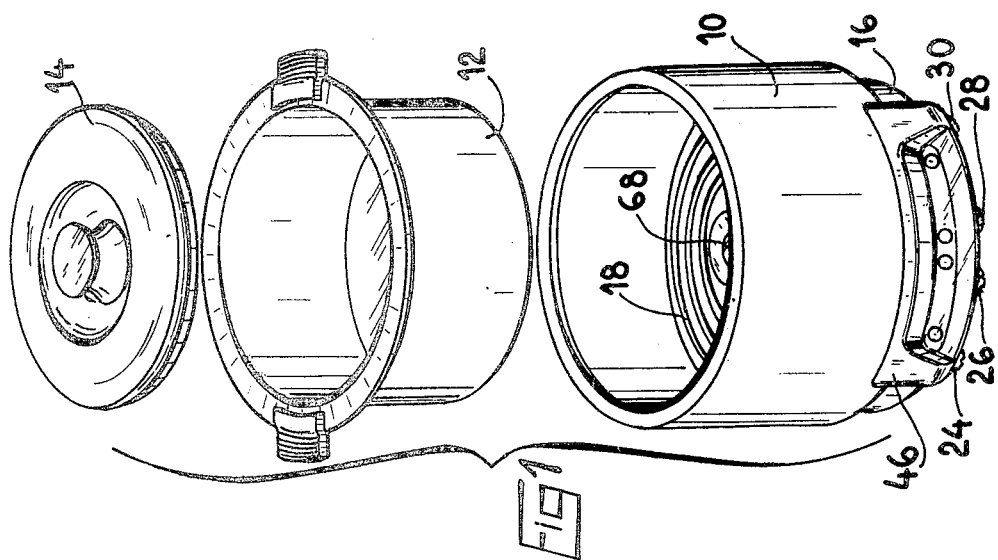

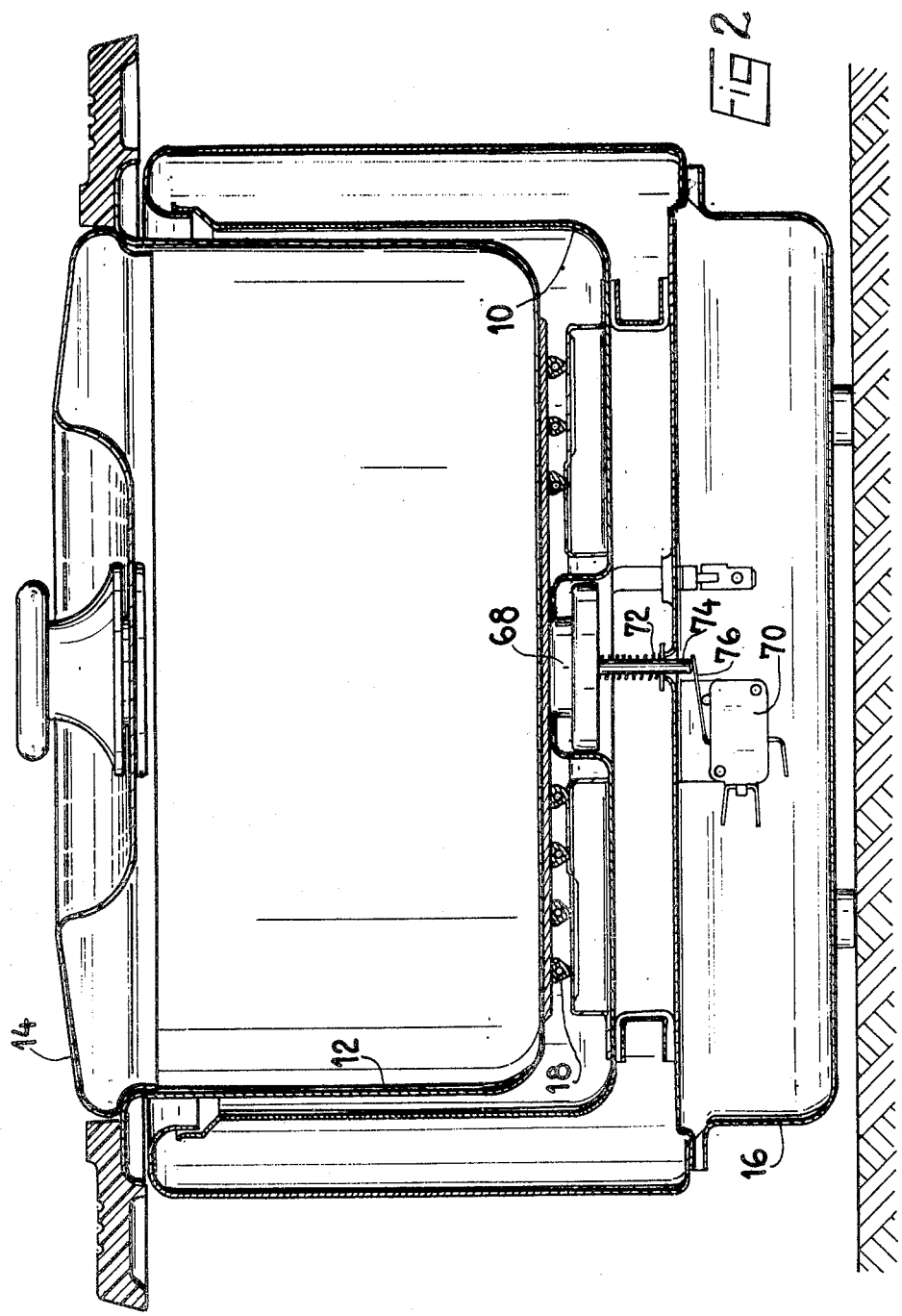

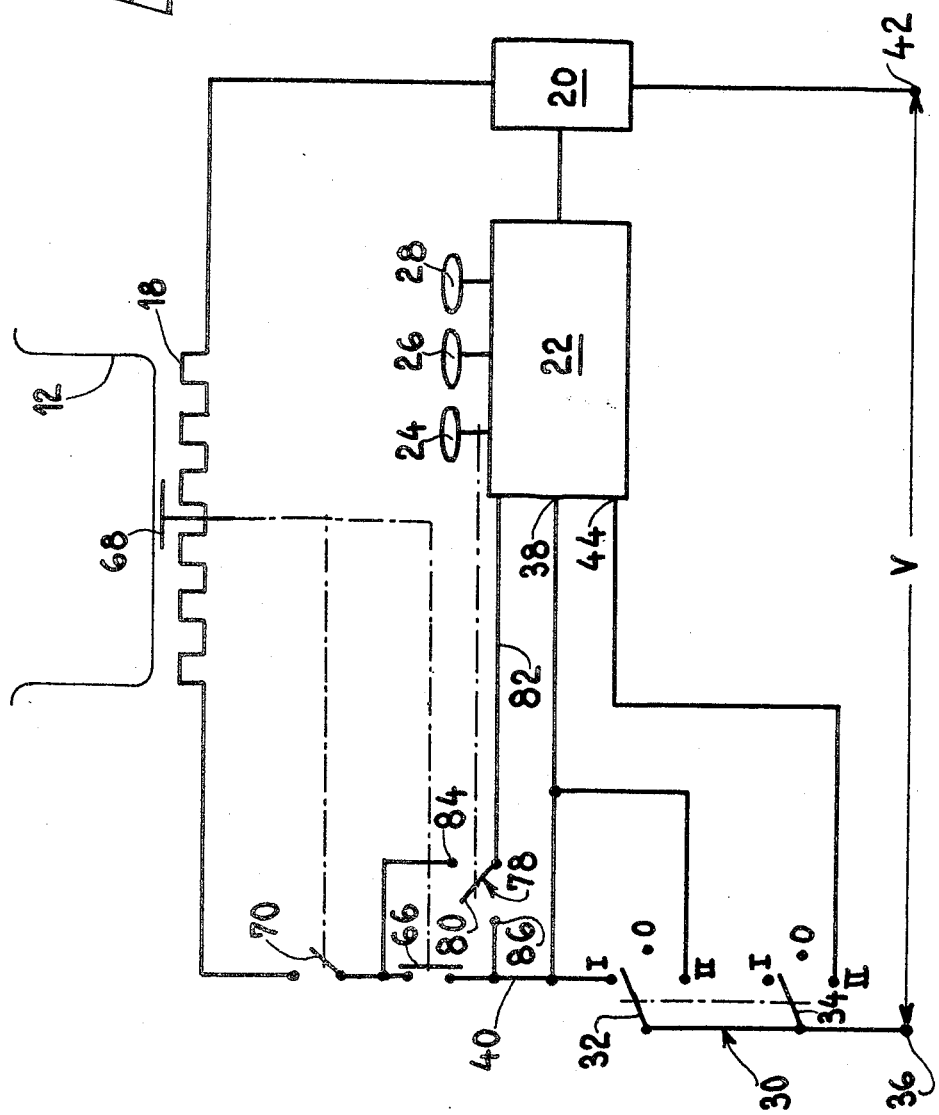

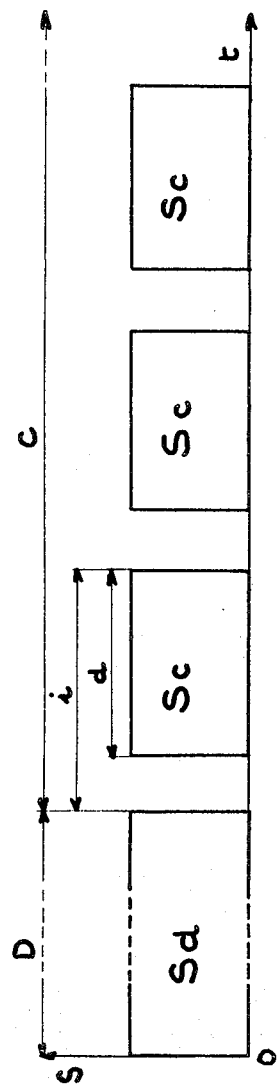
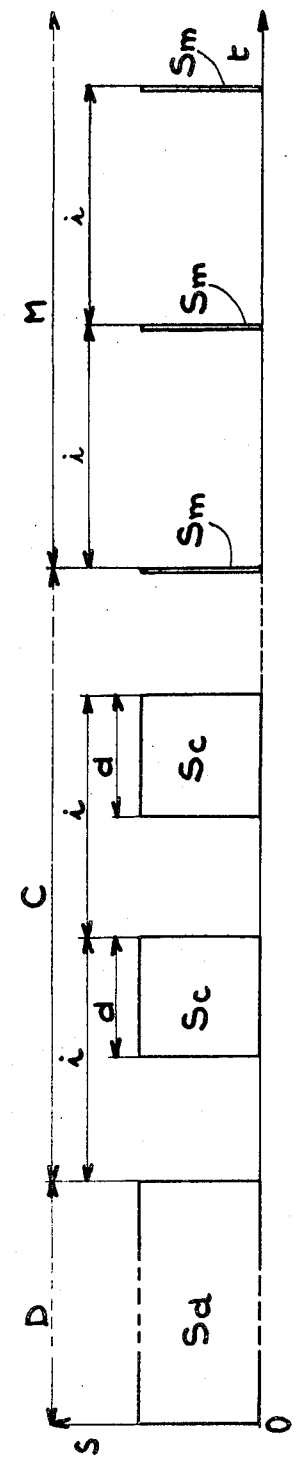

ELECTRIC COOKING APPLIANCE

BACKGROUND OF THE INVENTION

The present invention relates to electric cooking appliances which comprise a casing, an electrical heating element in the casing for heating a removable vessel for holding food and positionable in the casing, and a control device for controlling the supply of electrical power to the heating element.

More particularly, the invention relates to electric cooking appliances in which the control device comprises a supply switch which can adopt either a conducting state in which electrical power is applied to the heating element, or a non-conducting state in which power is no longer applied to the said element, and a control circuit which can be set by the user to supply the element intermittently via the supply switch, so that this element thus provides a predetermined average power for a predetermined period of time, referred to as the normal cooking phase.

It is an object of the invention to provide an electric cooking appliance with improvements which enable all kinds of foods, namely both vegetables and meat or fish, to be cooked correctly without supervision, and to cook foods which initially require a particular heating procedure.

SUMMARY OF THE INVENTION

According to the present invention there is provided an electric cooking appliance comprising a casing, a removable vessel for holding food to be cooked positionable in said casing, an electrical heating element mounted in said casing for heating said removable vessel, means for supplying electrical power, and a control device for controlling the supply of electrical power from said means to the heating element, said control device comprising a supply switch which can adopt a conducting state in which electrical power is supplied to said element and a non-conducting state in which electrical power is not supplied to said element, and a manually settable control circuit for controlling the state of the supply switch and operable during a normal cooking phase to place the supply switch intermittently in its conducting state such that the element provides a predetermined average power for a predetermined period of time, wherein the control circuit is arranged prior to the normal cooking phase to maintain the supply switch continuously in its conducting state for an initial period of time which is independent of the manual setting of the control circuit.

Preferably, the initial period of time is between one and five minutes.

Thus, the heating element provides its full nominal power in the initial period which forms an initial cooking phase and this causes accelerated heating of the vessel for holding food, which makes it possible, for example, suitably to brown the food in the fat before subjecting it to prolonged cooking.

BRIEF DESCRIPTION OF THE DRAWINGS

An embodiment of the present invention will hereinafter be described, by way of example, with reference to the accompanying drawings, in which:

FIG. 1 is an exploded perspective view of an electric cooking appliance of the present invention;

FIG. 2 shows, on a larger scale, a vertical section of the appliance of FIG. 1;

FIG. 3 is a top view of the control panel of the appliance;

FIG. 4 shows a partial vertical section taken along the line IV—IV of FIG. 3;

FIG. 5 shows schematically the circuit of a control device for controlling the heating element of the appliance;

FIG. 6 is a diagram illustrating the heating procedure of the element, as a function of time, when the average power supplied to the element during the normal cooking phase is equal to three-quarters of the nominal power; and FIG. 7 is an analogous diagram to FIG. 6 when the average power is equal to half the nominal power and when the normal cooking phase is followed by a phase in which the food is kept hot.

DESCRIPTION OF THE PREFERRED EMBODIMENTS

As is shown in FIG. 1, an electric cooking appliance of the invention comprises a casing 10 having the general shape of a cylindrical well which is supported on a base 16. The casing 10 receives a removable vessel 12 for holding food which is closed by a lid 14. A heating element in the form of a spiral shielded resistance 18 for heating the vessel 12, is arranged within the casing 10 in the region of its bottom and is disposed in a horizontal plane.

A device for controlling the resistance 18 is arranged in the base 16. As shown in FIG. 5, this device comprises an electronic supply switch 20 which can adopt either a conducting (ON) state, in which the voltage V of the mains is applied to the resistance 18, or a non-conducting (OFF) state, in which the mains voltage is no longer applied to this resistance, and an electronic control circuit 22 which the user can set in order to supply the resistance 18 intermittently via the supply switch 20 such that the resistance 18 provides a predetermined average power for a predetermined period of time, referred to as the normal cooking phase. For this purpose, as illustrated in FIGS. 6 and 7, during the normal cooking phase C, the control circuit 22 supplies the switch 20, at regular intervals i, with control signals Sc which keep this switch in the conducting state throughout their duration d, the duration d being dependent upon the setting of the circuit 22 selected by the user, the average power supplied to the resistance 18 thus being proportional to the ratio of the duration d to the interval i. Thus, in the case of FIG. 6, this average power is equal to three-quarters of the nominal power of the resistance, for example equal to 1,200 watts if the said nominal power is 1,600 watts; on the other hand, in the case of FIG. 7, the average power is equal to half the said nominal power, that is to say equal to 800 watts in the example in question. Preferably, the interval i is between ten and sixty seconds, for example about forty seconds.

As shown schematically in FIG. 5, the control circuit 22 has three regulating knobs, namely a first knob 24 intended for setting the duration d of the control signals Sc, that is to say for setting the average power during the phase C, and a second knob 26 and a third knob 28, which are intended for setting the duration of the phase C and are reserved respectively for setting the hours and the minutes.

Prior to the normal cooking phase C, the control circuit 22 automatically maintains the supply switch 20 in its conducting state (signal Sd) for a period of time D, referred to as the initial cooking phase, which is invariable regardless of the setting of the circuit 22 and which is preferably between one and five minutes, for example, approximately three minutes.

The device for controlling the resistance 18 also comprises a circuit-breaker 30 comprising two movable armatures 32 and 34 mechanically joined to one another (FIG. 5) and connected to a terminal 36 of the mains. Each armature 32, 34 can contact any one of three contact studs I, O and II. The contact studs I and II associated with the armature 32 are connected to a first input 38 of the control circuit 22 and also to a supply line 40 for the resistance 18, which resistance is also connected to the other terminal 42 of the mains via the switch 20. The stud II associated with the armature 34 is connected to a second input 44 of the circuit 22. The contact studs O associated with the armatures 32 and 34, and the contact stud I associated with the armature 34 are all electrically isolated.

When the armatures 32 and 34 of the circuit-breaker 30 occupy a first position, referred to as the simple cooking position, that is when they are each in contact with the respective stud I, the control circuit 22, which is then activated by way of its input 38, normally ensures the supply to the resistance 18 throughout cooking (phases D and C) and switches off the supply at the end of the cooking period, that is at the end of the period which has been set by the user by way of the knobs 26 and 28. On the other hand, when the armatures 32 and 34 occupy a second position, referred to as the cooking position with a phase in which the food is kept hot, that is when they are each in contact with the respective stud II, the control circuit 22, which is then also activated by way of its input 44, not only ensures cooking (phases D and C) but subsequently supplies the switch 20, at regular intervals i, with short control signals Sm (FIG. 7) of which the duration (for example of less than one second) is invariable regardless of the setting of the circuit 22. This phase M, in which the food is kept hot after cooking, continues until the armatures 32 and 34 of the circuit-breaker 30 are each brought into contact with the respective stud O, that is into the position in which the appliance is totally switched off.

As shown clearly in FIGS. 3 and 4, the regulating knobs 24, 26 and 28 and a knob for operating the circuit-breaker 30 each consist of a disc which is mounted so as to be rotatable about a vertical spindle in an extension 46 of the base 16, which extension constitutes a control panel. This extension projects laterally of the external wall 48 of the casing 10 and houses a plate 50 supporting the control circuit 22 and the switch 20. On its external edge, the control panel 46 possesses four slots through which a segment of each of the four discs 24 to 30 projects, the projecting segments forming the operating contacts of these discs. On its top face 52 the control panel has four small transparent convex lenses 54, 56, 58 and 60, which make it possible to see indications carried by the respective discs. The disc 24 carries FIGS. 1 to 10 which represent power markings, the disc 26 carries FIGS. 1 to 5 which indicate hours, the disc 28 carries figures in tens which indicate minutes, and the disc 30 carries the signs I, O and II. A channel 62 is formed in the top face 52 of the control panel adjacent the external wall 48 of the casing 10. This channel 62 is arranged to collect any liquid overflowing from the vessel 12 and thus to prevent the liquid reaching the slots through which the segments of the knobs 24 to 30 project. This channel 62 is separated from these knobs by a boss 64 which forms a protection barrier.

The device for controlling the resistance 18 (FIG. 5) also comprises a thermostat 66 for limiting the temperature (for example to 175° C.), which is connected in series with the resistance 18 and which is controlled by a temperature-detecting sensor 68 applied elastically against the bottom of the vessel 12. In addition, the device comprises a safety switch 70, which is connected in series between the thermostat 66 and the resistance 18 and which is closed when the vessel 12 is placed within the casing 10. As shown in FIG. 2, the sensor 68 is located in the central region of the resistance 18 and is mounted to move vertically against the action of a spring 72 which surrounds a rod 74 which is fixed to the sensor 68. The rod 74 simultaneously controls a contact 76 for operating the safety switch 70.

The device for controlling the resistance 18 further comprises a contactor 78 (FIG. 5) which comprises a movable armature 80 connected to a line 82 for activating the control circuit 22 and two contact studs 84 and 86 connected to respective terminals of the thermostat 66. The supply of control signals Sc by the control circuit 22 is dependent upon the application of the mains voltage V to the line 82, and therefore when the armature 80 is in its position in contact with the stud 84, signals Sc are only emitted when the thermostat 66 is closed, whereas when the armature is in its second position in contact with the stud 86, the control signals are emitted independently of the state of the thermostat. The movable armature 80 is mechanically connected to the power-regulating knob 24 such that the armature is in its first position (stud 84) for the low powers (for example markings 1 to 3 on the knob 24) and is in its second position (stud 86) for higher powers (for example markings 4 to 10). Thus, for low powers, the thermostat 66 acts as a safety device capable of switching off the appliance when the temperature of the vessel rises above a predetermined value, whereas, for higher powers, the thermostat 66 acts as a control device capable of maintaining the vessel at the predetermined temperature (about 175° C.).

To operate the appliance, the vessel 12 containing the food to be cooked is placed in the casing 10, the user sets the power-regulating knob 24 to a position suitable for the food to be cooked (for example position 5, corresponding to an average power of 800 watts, as shown in FIG. 3), and then the user sets the knobs 26 and 28 to the positions corresponding to the time desired for normal cooking (for example 1 hour 20 minutes). The user then sets the knob 30 either to position I for simple cooking, or to position II for cooking with a phase in which the food is kept hot (as in the example of FIG. 3).

As from this moment, because the thermostat 66 and the switch 70 are closed, the initial cooking phase D starts automatically and the resistance 18 continuously provides its full nominal power. During this phase D, the vessel 12 rapidly reaches a high temperature which, for example, enables the user suitably to brown pieces of meat in fat, prior to subjecting them to prolonged cooking.

After the phase D, the normal cooking phase C proceeds, followed, if appropriate, by the phase M, at reduced power, in which the food is kept hot.

If, for example for the full-power setting (position 10 of the knob 24 and hence the second position of the armature 80), the temperature of the vessel during phase C exceeds the predetermined value allowed by the thermostat 66, this thermostat opens and, acting as a control device, cuts off the supply to the resistance 18; the vessel then cools slightly until it reaches the threshold value of the thermostat, at which value the thermostat closes again and resumes the supply to the resistance.

If, for a lower-power setting (positions 1 to 3 of the knob 24 and hence the first position of the fitting 80), the temperature of the vessel during phase C exceeds the predetermined value allowed by the thermostat 66, as a result of an abnormal condition, such as insufficient water in the food which is being cooked, the thermostat 66 opens and, acting as a safety device, stops the operation of the circuit 22 and hence the operation of the appliance.

If, for some reason, the user removes the vessel 12 from the casing 10, the sensor 68 rises by the action of the spring 72, and this causes the switch 70 to open and the heating to stop.

Thus, with the cooking appliance described it is possible to carry out, in total safety, diverse types of cooking ranging from simmering at low temperature for a prolonged period of time to deep frying at high temperature.

I claim:

1. Electric cooking appliance comprising a casing, a removable vessel for holding food to be cooked positionable in said casing, an electrical heating element mounted in said casing for heating said removable vessel, means for supplying electrical power, and a control device for controlling the supply of electrical power from said means to the heating element, said control device comprising a supply switch which can adopt a conducting state in which electrical power is supplied to said element and a non-conducting state in which electrical power is not supplied to said element, and a manually settable control circuit for controlling the state of the supply switch and operable during a normal cooking phase to place the supply switch intermittently in its conducting state such that the element provides a predetermined average power for a predetermined period of time, wherein the control circuit is arranged prior to the normal cooking phase to maintain the supply switch continuously in its conducting state for an initial period of time which is independent of the manual setting of the control circuit.

2. Cooking appliance according to claim 1, wherein said initial period of time is between one and five minutes.

3. Cooking appliance according to claim 2, wherein said initial period of time is approximately three minutes.

4. Cooking appliance according to claim 1, wherein the supply switch is an electronic switch and the control circuit is an electronic circuit, and wherein, during the normal cooking phase, the electronic control circuit supplies a plurality of control signals of equal duration to said supply switch at regular intervals, each control signal being arranged to keep the supply switch in its conducting state throughout its duration, the said duration of the control signals being dependent upon the manual setting of said control circuit, and the average power supplied to the resistance being proportional to the ratio of the duration of the control signals to the interval between control signals.

5. Cooking appliance according to claim 4, wherein the interval between the control signals is between ten and sixty seconds.

6. Cooking appliance according to claim 4, wherein the control circuit comprises first, second and third regulating knobs, the first knob being arranged to set the duration of the control signals and thus to set the average power, and the second and third knobs being arranged to set the duration of the normal cooking phase, the second knob being arranged to set the hours and the third knob being arranged to set the minutes of the duration of the normal cooking phase.

7. Cooking appliance according to claim 1, wherein said control device further comprises a thermostat connected in series with said element for limiting the temperature of said vessel, and a sensor for detecting the temperature of said vessel connected to control said thermostat.

8. Cooking appliance according to claim 6, wherein the control circuit has a control line and the supply of control signals by said control circuit is dependent upon the supply of electrical power to said control line, and wherein the control device further comprises a contactor for controlling the supply of electrical power from said means to said control line, said contactor having a movable armature movable between a first position and a second position, a thermostat connected in series with said element for limiting the temperature of said vessel, and a sensor for detecting the temperature of said vessel connected to control said thermostat, and wherein in the first position of the armature of the contactor the thermostat is connected in series with the control line and in the second position of the armature the control line is independent of the thermostat, the armature of the contactor being mechanically connected to said first knob of the control circuit such that it is in its first position for low power settings and is in its second position for higher power settings.

9. Cooking appliance according to claim 7 or claim 8, wherein said sensor of the thermostat is mounted so as to be movable against the action of a spring, and said sensor is arranged to operate a safety switch which is connected in series with said element, the closing of said safety switch being dependent upon the placing of the vessel within the casing.

10. Cooking appliance according to claim 4, wherein said control device further comprises a circuit-breaker which can occupy either a first position for simple cooking, in which the control circuit ensures the supply to the element throughout cooking and completely cuts it off when this cooking has ended, or a second position for cooking with a phase in which the food is kept hot, in which the control circuit, after cooking, supplies the supply switch, at regular intervals with short control signals, the duration of which is invariable regardless of the setting of the said control circuit.

11. Cooking appliance according to claim 6, wherein the casing has the shape of a cylindrical well and is supported by a base, said resistance being arranged in a horizontal plane in the region of the bottom of the well, and wherein said regulating knobs are arranged in an extension of the base which projects laterally relative to the external wall of the said well, said extension housing a plate supporting the control circuit and the supply switch, and said extension possessing, on its upper face, a channel adjacent the external wall of the well and separated from the said knobs by a protection boss.

* * * * *